United States Patent Office 3,094,545
Patented June 18, 1963

3,094,545
CYCLIC ARSENIC AND PHOSPHORUS COMPOUNDS AND METHODS OF PREPARING SAME
Richard P. Welcher, Old Greenwich, Gerald A. Johnson, Stamford, and Vernon P. Wystrach, Noroton Heights, Conn., assignors to American Cyanamid Company, New York, N.Y., a corporation of Maine
No Drawing. Filed June 27, 1960, Ser. No. 38,697
33 Claims. (Cl. 260—440)

The present invention relates to novel cyclic phosphorus-containing and arsenic-containing organic compounds and methods of preparing same. More particularly, the instant discovery concerns the cyclization of bis(2-cyanoethyl)alkyl- and bis(2-cyanoethyl)aryl-phosphines or arsines in the presence of catalysts to prepare the corresponding 4-amino-1-alkyl- and 4-amino-1-aryl-1,2,5,6-tetrahydrophosphorin-3-carbonitriles and 1,2,5,6-tetrahydroarsenin-3-carbonitriles. The phosphorin-3-carbonitriles may in turn be reacted with water in the presence of an acid to provide the respective cyclic 1-alkyl- and 1-aryl-phosphoridinones.

The following generic equations teach, broadly, the instant discovery:

(A)
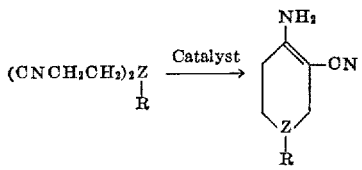

(B)
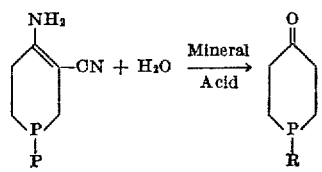

wherein Z in the formulae is phosphorus or arsenic and R is a member selected from the group consisting of alkyl $C_1$–$C_{20}$, substituted and unsubstituted; aryl, substituted and unsubstituted; said substituents on the alkyl moiety being selected from the group consisting of hydroxy, lower alkoxy, amino, phenyl, pyridyl, furyl and thienyl; and said substituents on the aryl moiety being selected from the group consisting of lower alkyl and halogen.

The present invention, therefore, provides, quite surprisingly novel cyclic 4-amino-1-alkyl- and 4-amino-1-aryl-1,2,5,6-tetrahydrophosphorin-3-carbonitriles and 1, 2, 5,6-tetrahydroarsenin-3-carbonitriles and cyclic 1-alkyl- and 1-aryl-phosphoridinones of high purity and in high yields in a straightforward manner.

As will be seen hereinafter, the phosphorus-containing intermediate products contemplated herein, i.e., the 1,2,5, 6-tetrahydrophosphorin-3-carbonitriles, may be recovered prior to being reacted with water in the presence of an acid to produce the corresponding cyclic phosphoridinones. Alternatively, however, the intermediates may be treated in situ to yield their respective final phosphoridinone products. The advantages inherent in each of these processes will be apparent from the description infra.

Typical catalysts within the purview of the instant invention are alkali metal alkoxides, such as sodium t-butoxide, sodium isopropoxide, sodium ethoxide, potassium t-butoxide, potassium isopropoxide, and the like. Of these sodium t-butoxide is preferred. Other catalysts contemplated herein are finely dispersed alkali metals, such as sodium or potassium metal; sodium amide; metal derivatives of secondary alkylarylamines.

Typical bis(2-cyanoethyl)alkylphosphine, bis(2-cyanoethyl)alkylarsine, bis(2 - cyanoethyl)arylphosphine and bis(2-cyanoethyl)arylarsine reactants are:

bis(2-cyanoethyl)ethylphosphine;
bis(2-cyanoethyl)octylphosphine;
bis(2-cyanoethyl)-3-eicosylphosphine;
bis(2-cyanoethyl)-1-(3'-aminopropyl)phosphine;
bis(2-cyanoethyl)-3-hydroxypropylphosphine;
bis(2-cyanoethyl)-2-methoxyethylphosphine;
bis(2-cyanoethyl)-2-(2'-thienyl)ethylphosphine;
bis(2-cyanoethyl)-2-(2'-pyridyl)ethylphosphine;
bis(2-cyanoethyl)phenylphosphine;
bis(2-cyanoethyl)tolylphosphine;
bis(2-cyanoethyl)-1-(trimethylphenyl)phosphine;
bis(2-cyanoethyl)-1-chlorophenylphosphine;
bis(2-cyanoethyl)methylarsine;
bis(2-cyanoethyl)ethylarsine;
bis(2-cyanoethyl)propylarsine;
bis(2-cyanoethyl)amylarsine;
bis(2-cyanoethyl)octylarsine;
bis(2-cyanoethyl)dodecylarsine;
bis(2-cyanoethyl)hexadecylarsine;
bis(2-cyanoethyl)eicosylarsine;
bis(2-cyanoethyl)-3-aminopropylarsine;
bis(2-cyanoethyl)-3-hydroxypropylarsine;
bis(2-cyanoethyl)-2-methoxyethylarsine;
bis(2-cyanoethyl)-2-(2'-thienyl)ethyl arsine;
bis(2-cyanoethyl)-2-(2'-pyridyl)ethyl arsine;
bis(2-cyanoethyl)phenylarsine;
bis(2-cyanoethyl)tolylarsine;
bis(2-cyanoethyl)benzylarsine;
bis(2-cyanoethyl)-2'-methylphenylarsine;
bis(2-cyanoethyl)-4'-methylphenylarsine;
bis(2-cyanoethyl)-4'-aminophenylarsine;
bis(2-cyanoethyl)-4'-hydroxyphenylarsine;
and the like.

The arsine reactants are prepared essentially as shown in Journal of Chemical Society (1949), 67, page 69 and Journal of Chemical Society (1947) page 621 by reacting the corresponding alkyl arsine or aryl arsine with vinyl cyanide.

Their corresponding cyclization products are:

4-amino-1,2,5,6-tetrahydro-1-ethylphosphorin-3-carbonitrile;
4-amino-1,2,5,6-tetrahydro-1-octylphosphorin-3-carbonitrile;
4-amino-1,2,5,6-tetrahydro-1-eicosplphosphorin-3-carbonitrile;
4-amino-1,2,5,6-tetrahydro-1-(3'-hydroxypropyl)phosphorin-3-carbonitrile;
4-amino-1,2,5,6-tetrahydro-1-(2'-methoxyethyl)phosphorin-3-carbonitrile;
4-amino-1,2,5,6-tetrahydrol-1-(3'-aminopropyl)phosphorin-3-carbonitrile;

4-amino-1,2,5,6-tetrahydro-1-[2'-(2''-pyridyl)
　　ethyl]phosphorin-3-carbonitrile;
4-amino-1,2,5,6-tetrahydro-1-[2'-(2''-thienyl)ethyl]
　　phosphorin-3-carbonitrile;
4-amino-1,2,5,6-tetrahydro-1-phenylphosphorin-3-
　　carbonitrile;
4-amino-1,2,5,6-tetrahydro-1-tolylphosphorin-3-
　　carbonitrile;
4-amino-1,2,5,6-tetrahydro-1-(trimethylphenyl)phosphorin-3-carbonitrile;
4-amino-1,2,5,6-tetrahydro-1-(chlorophenyl)phosphorin-3-carbonitrile;
4-amino-1,2,5,6-tetrahydro-1-methylarsenin-3-carbonitrile;
4-amino-1,2,5,6-tetrahydro-1-ethylarsenin-3-carbonitrile;
4-amino-1,2,5,6-tetrahydro-1-propylarsenin-3-carbonitrile;
4-amino-1,2,5,6-tetrahydro-1-amylarsenin-3-carbonitrile;
4-amino-1,2,5,6-tetrahydro-1-octylarsenin-3-carbonitrile;
4-amino-1,2,5,6-tetrahydro-1-dodecylarsenin-3-
　　carbonitrile;
4-amino-1,2,5,6-tetrahydro-1-hexadecylarsenin-3-
　　carbonitrile;
4-amino-1,2,5,6-tetrahydro-1-eicosylarsenin-3-
　　carbonitrile;
4-amino-1,2,5,6-tetrahydro-1-(3'-aminopropyl)arsenin-3-carbonitrile;
4-amino-1,2,5,6-tetrahydro-1-(3'-hydroxypropyl)-arsenin-3-carbonitrile;
4-amino-1,2,5,6-tetrahydro-1-(2'-methoxymethyl)arsenin-3-carbonitrile;
4-amino-1,2,5,6-tetrahydro-1-[2'-(2''-thienyl)
　　ethyl]arsenin-3-carbonitrile;
4-amino-1,2,5,6-tetrahydro-1-[2'-(2''-pyridyl)ethyl]
　　arsenin-3-carbonitrile;
4-amino-1,2,5,6-tetrahydro-1-phenyl-arsenin-
　　3-carbonitrile;
4-amino-1,2,5,6-tetrahydro-1-tolylarsenin-3-carbonitrile;
4-amino-1,2,5,6-tetrahydro-1-benzylarsenin-3-carbonitrile;
4-amino-1,2,5,6-tetrahydro-2'-methylphenylarsenin-
　　3-carbonitrile;
4-amino-1,2,5,6-tetrahydro-4'-methylphenylarsenin-
　　3-carbonitrile;
4'-amino-1,2,5,6-tetrahydro-4-aminophenylarsenin-
　　3-carbonitrile;
4-amino-1,2,5,6-tetrahydro-4'-hydroxyphenylarsenin-
　　3-carbonitrile;
and the like.

The alkyl- or aryl-phosphorin-3-carbonitrile cyclization products, in turn, upon reaction with water according to the process taught herein, yield the following products:

1-ethyl-4-phosphoridinone;
1-octyl-4-phosphoridinone;
1-eicosyl-4-phosphoridinone;
1-(3'-hydroxypropyl)-4-phosphoridinone;
1-(3'-aminopropyl)-4-phosphoridinone;
1-(2'-methoxyethyl)-4-phosphoridinone;
1-[2'-(2''-pyridyl)ethyl]-4-phosphoridinone;
1-[2-(2'-thienyl)ethyl]-4-phosphoridinone;
1-phenyl-4-phosphoridinone;
1-(trimethylphenyl)-4-phosphoridinone;
1-chlorophenyl-4-phosphoridinone;
and the like.

Generally, the first step of the reaction contemplated herein, i.e., cyclization of bis(2-cyanoethyl)alkyl- or bis(2-cyanoethyl)aryl- phosphine or arsine is carried out in the presence of a solvent in which the dinitrile reactant and catalyst or condensing agent are soluble and inert. Preferably, an alcohol corresponding to the alkoxide catalyst is used. Aromatic hydrocarbons, such as benzene, toluene, and the like, are also contemplated, as well as ethers of ethylene glycol, ethers of diethylene glycol, dioxane, and other similar ethers. In other words, organic solvents which are typical are those substantially inert with respect to the dinitrile reactant, the catalyst and the cyclization product under the conditions of the reaction.

While the cyclization step of the process of the present invention is readily carried out at ambient temperature (20° C.–25° C.), temperatures in the range of 15° C. to 140° C., preferably 80° C. to 120° C., may be employed. Usually temperatures in the vicinity of the boiling point of the solvent are employed, since it is very often desirable to place the reaction mixture under reflux.

While atmospheric pressure is preferred for the cyclization step, super-atmospheric or sub-atmospheric pressures are contemplated.

The dinitrile reactant:catalyst molar ratio employed is usually about 1:1; however, an excess of the molar amount of either component with respect to the other may be employed without a deleterious effect being experienced. Undue excesses, however, tend to be cumbersome and impractical.

It has been found that the nitrile is best added to the base catalyst to provide but a relatively small concentration of nitrile at any time during the reaction, i.e., an excess of catalyst is desirable throughout substantially all of the reaction. While it is not intended that the invention be restricted to any particular theory, it is believed that a small concentration of dinitrile maximizes intramolecular reaction which gives the desired cyclic product and minimizes intermolecular reactions which would tend to occasion undesirable polymeric products. In addition, the excess base catalyst lessens side reactions between cyclic product and uncyclized dinitrile.

The amino- and cyano-substituted phosphorin-3-carbonitrile cyclization intermediate contemplated herein is readily converted to its corresponding phosphoridinone by reaction with water in the presence of a mineral acid. Typical acids within the purview of the instant discovery are HCl, HBr, HI, $H_3PO_4$ and other like non-oxidizing strong acids, i.e., acids which under the conditions of the reaction do not oxidize the intermediates and/or final products. This step of the process may be carried out in situ, as indicated hereinabove, by merely adding water and a mineral acid to the unseparated cyclization product and heating to a temperature in the range of 25° C.–110° C., usually at about 110° C., the reflux temperature of the water under the conditions contemplated. Alternatively, the cyclization product may be recovered and subsequently treated as just suggested.

As in the case of the step described hereinabove for producing the intermediate, super-atmospheric or sub-atmospheric pressures may be employed. If super-atmospheric pressures are employed, correspondingly higher reflux temperatures are generally indicated.

Depending upon the reaction conditions, such as pressure, temperature, and the like, and the intermediate employed as reactant, reaction times on the order of 1 to 25 hours or more are contemplated. Generally, however, 5 to 20 hours are adequate; and usually some reaction begins in less than one hour.

The sequence of addition in this step is inconsequential and no solvent need be employed.

According to a preferred embodiment, the phosphorus or arsenic cyclization intermediate as formed in the first step is usually an alkali metal salt from which the desired cyclic product is liberated, if desired, by treatment with water at room temperature, extraction with organic solvent, drying and removal of solvent. To obtain the phosphoridinone final product from the phosphorus-containing intermediate treatment with water and acid at elevated temperature is best suited.

The present invention will best be understood by virtue of the following examples:

EXAMPLE I

4-Amino-1,2,5,6-Tetrahydro-1-Ethylphosphorin-3-Carbonitrile

A solution of 42 grams (0.25 mole) of bis(2-cyanoethyl) ethylphosphine in 10 milliliters of dry toluene is added dropwise to a stirred suspension of sodium tertiary-butoxide prepared from 6.0 grams (0.29 mole) of sodium metal and excess dry tertiary-butyl alcohol in 150 milliliters of dry toluene. The mixture is refluxed during the 2.5 hour addition, and for 1 hour more. A nitrogen atmosphere is used. The cool mixture is admixed with 50 milliliters of water and extracted with chloroform. From the dry chloroform extract is obtained 35 grams of crystalline solid which melts at 68° C.–71° C. Recrystallization from aqueous alcohol followed by chromatographic purification gives white crystals, melting point 74.5° C.–75° C.

Analysis.—Calculated for $PN_2C_8H_{13}$: C, 57.13; H, 7.79; P, 18.42; N, 16.66; molecular weight, 168. Found: C, 57.14; H, 7.80; P, 18.49; N, 16.60; molecular weight, 163.

Infrared and ultraviolet spectra confirm the identity of the product as 4-amino-1,2,5,6-tetrahydro-1-ethylphosphorin-3-carbonitrile.

EXAMPLE II

1-Ethyl-4-Phosphoridinone

A solution of 15.9 grams (0.094 mole) of 4-amino-1,2,5,6-tetrahydro-1-ethylphosphorin-3-carbonitrile (produced as in Example I, above) in 75 milliliters (0.40 mole) of 6 normal hydrochloric acid is refluxed for 6 hours. Additional acid is added and the refluxing continued 15 hours. The solution is taken to dryness at reduced pressure. The residue is treated with 7.2 grams (0.18 mole) of sodium hydroxide and extracted with ether. The dry ether extract is distilled to give a water-white liquid boiling at 83° C.–85° C. at 1 millimeter mercury pressure. The product is 1-ethyl-4-oxophosphoridin.

EXAMPLE III

(a) 4-Amino-1,2,5,6-Tetrahydro-1-Octylphosphorin-3-Carbonitrile

(b) 1-Octyl-4-Phosphoridinone 15.1 grams (0.060 mole) of bis(2-cyanoethyl)octylphosphine dissolved in 50 milliliters of isopropyl alcohol is added dropwise to a refluxing solution of 1.6 grams (0.07 mole) of sodium in 50 milliliters of isopropyl alcohol over a period of 1.9 hours. After an additional 0.7 hour of reflux the mixture is worked up as before to give 12.5 grams of syrupy crystalline solid (83 percent by weight of theory yield). Without further purification the solid product (a) 4-amino-1,2,5,6-tetrahydro-1-octylphosphorin-3-carbonitrile is treated by refluxing for 15 hours with 160 milliliters (1.0 mole) of 6 normal HCl to give 4.1 grams (25 percent by weight of theory yield) of a liquid whose infrared spectrum shows it to be (b) 1-octyl-4-phosphoridinone.

EXAMPLE IV

(a) 4-Amino-1,2,5,6-Tetrahydro-1-(3'-Hydroxypropyl)Phosphorin-3-Carbonitrile

(b) 1-(3'-Hydroxypropyl)-4-Phosphoridinone

Twenty grams (0.10 mole) of bis(2-cyanoethyl)-3-hydroxypropyl phosphine, dissolved in 20 milliliters of tertiary-butyl alcohol, is added to a hot solution of excess sodium tertiary-butoxide in 150 milliliters of tertiary-butyl alcohol, followed by 3 hours of refluxing, cooling and the addition of water. Ten grams of 4-amino-1,2,5,6-tetrahydro-1-(3'-hydroxypropyl)phosphorin-3-carbonitrile is recovered.

This material is refluxed for 15 hours with excess 6 normal hydrochloric acid and 1-(3'-hydroxypropyl)-4-phosphoridinone recovered.

EXAMPLE V

(a) 4-Amino-1,2,5,6-Tetrahydro-1-(2'-Methoxyethyl)Phosphorin-3-Carbonitrile

(b) 1-(2'-Methoxyethyl)-4-Phosphoridinone

Example IV is repeated in every essential respect only 30 grams (0.15 mole) of bis(2-cyanoethyl)-2-methoxyethyl phosphine is employed and 24 grams of 4-amino-1,2,5,6 - tetrahydro-1-(2'-methoxyethyl)phosphorin-3-carbonitrile is recovered, which, in turn, is transformed into 1-(2'-methoxyethyl)-4-phosphoridinone.

EXAMPLE VI

Example III is repeated in every essential respect using, however, bis(2-cyanoethyl)eicosyl phosphine which cyclizes to 4-amino-1,2,5,6-tetrahydro-1-eicosylphosphorin-3-carbonitrile. The latter then yields 1-eicosyl-4-phosphoridinone.

EXAMPLE VII

Example III is repeated in every essential respect using, however, 3-aminopropyl bis(2-cyanoethyl) phosphine which cyclizes to 4-amino-1,2,5,6-tetrahydro-1-(3'-aminopropyl)phosphorin-3-carbonitrile which, in turn, gives 1-(3'-aminopropyl)-4-phosphoridinone.

EXAMPLE VIII

(a) 4-Amino-1,2,5,6-Tetrahydro-1-[2'-(2''-Pyridyl)Ethyl]Phosphorin-3-Carbonitrile

(b) 1-[2'-(2''-Pyridyl)Ethyl]-4-Phosphoridinone

Example III is repeated in every essential respect using, however, bis(2-cyanoethyl)-2-(2'-pyridyl) ethylphosphine which cyclizes to 4-amino-1,2,5,6-tetrahydro-1-[2'-(2'' - pyridyl)ethyl]phosphorin - 3 - carbonitrile which, in turn, gives 1-[2'-(2''-pyridyl)ethyl]-4-phosphoridinone.

EXAMPLE IX

Example III is repeated in every essential respect using, however, bis(2-cyanoethyl)-2-[2'-thienyl] ethylphosphine which is refluxed with excess sodium tertiary-butoxide in tertiary-butyl alcohol and yields 4-amino-1,2,5,6 - tetrahydro - 2 - [2' - thienyl]ethylphosphorin - 3-carbonitrile which, in turn, yields 1-[2'-(2''-thienyl)ethyl]-4-phosphoridinone when reacted with 6 normal hydrochloric acid under reflux.

EXAMPLE X

(a) 4-Amino-1,2,5,6-Tetrahydro-1-Phenylphosphorin-3-Carbonitrile

(b) 1-Phenyl-4-Phosphoridinone

To a slurry of sodium tertiary-butoxide, prepared from 2.9 grams (0.126 mole) of sodium metal and tertiary-butyl alcohol, in 160 milliliters of toluene is added dropwise over a period of 2 hours a solution of 15.5 grams (0.072 mole) of bis(2-cyanoethyl) phenylphosphine in 20 milliliters of toluene. A precipitate appears during the addition. After an additional hour of refluxing water is added to the slurry and the precipitate is then filtered off and dried to give 12.4 grams of 4-amino-1,2,5,6-tetrahydro - 1 - phenylphosphorin - 3 - carbonitrile, melting point 135° C.–138° C. The material is then treated for 10 hours in refluxing 6 normal hydrochloric acid to yield 1-phenyl-4-phosphoridinone, melting point 43° C.–44° C.

EXAMPLE XI

Example X is repeated in every essential respect using, however, bis(2-cyanoethyl)tolylphosphine which is refluxed with excess sodium tertiary-butoxide to yield 4 - amino - 1,2,5,6 - tetrahydro - 1 - tolylphosphorin - 3-carbonitrile. Treatment of this intermediate with refluxing 6 normal hydrochloric acid gave 1-tolyl-4-phosphoridinone.

EXAMPLE XII

Example X is repeated in every essential respect using, however, bis(2-cyanoethyl)trimethylphenylphosphine to yield 4-amino-1,2,5,6-tetrahydro-1-(trimethylphenyl)-phosphorin-3-carbonitrile. Treatment of this material with 6 normal HCl gives 1-(trimethylphenyl)-4-phosphoridinone.

EXAMPLE XIII

Example X is repeated in every essential respect using, however, chlorophenylbis(2-cyanoethyl) phosphine and excess sodium tertiary-butoxide and refluxing in tertiary-butyl alcohol to yield 4-amino-1-chlorophenyl-1,2,5,6 - tetrahydrophosphorin - 3 - carbonitrile. Treatment of this material with refluxing 6 normal hydrochloric acid gives chlorophenyl-4-phosphoridinone.

EXAMPLE XIV

4-Amino-1,2,5,6-Tetrahydro-1-Phenylarsenin-3-Carbonitrile

To a refluxing slurry of sodium tertiary-butoxide in tertiary-butyl alcohol, prepared from 2.3 grams (0.10 mole) of sodium metal and 110 milliliters of dry tertiary-butyl alcohol is added dropwise 17.3 grams (0.0664 mole) of bis(2-cyanoethyl)phenylarsine over a period of 1.3 hours. Refluxing is continued for 2 hours. The slurry is then cooled to 20° C. and hydrolyzed with 20 milliliters of water. The mixture is dried and stripped of solvent to give 13.8 grams (80 percent yield) of an orange syrup whose infrared spectrum shows it to be 4-amino-1,2,5,6-tetrahydro-1-phenylarsenin-3-carbonitrile without any starting material left. A small portion is analyzed, after further purification by chromatography on alumina followed by recrystallization. Melting point 65° C.–67° C. Calculated for $C_{12}H_{13}N_2As$: C, 55.40; H, 5.04; N, 10.77; As, 28.20; molecular weight, 260. Found: C, 55.40; H, 5.04; N, 10.58; As, 28.70; molecular weight 277. Infrared bands at 3480, 3380, 2180, 1643 and 1605 cm.$^{-1}$.

EXAMPLES XV–XXVI

The following examples are carried out essentially as in Example XIV, above, yet using the reactants and conditions given in the table:

EXAMPLE XXVII

4-Amino-1,2,5,6-Tetrahydro-1-Methylphosphorin-3-Carbonitrile $LiAlH_4$ is added slowly under nitrogen to diethyl ether, the solvent, until dissolved. The phosphine diluted with 30 milliliters of $Et_2O$ is added dropwise for 55 minutes. Exotherm results. The grey reaction mixture is refluxed (36° C.) for 22 hours. Thirty percent NaOH is added dropwise to the solution. The temperature is kept at 10° C.–15° C. with an ice bath. Two layers form. The top-ether layer is decanted and solvent distilled off at reduced pressure. White product solid results which is washed with benzene and dried in a vacuum desiccator. The product is 4-amino-1,2,5,6-tetrahydro-1-methylphosphorin-3-carbonitrile.

EXAMPLE XXVIII

The process of Example XXVII is repeated in every essential respect with the exception that the catalyst $LiAlH_4$ is replaced by sodium hydride. The same product is recovered.

EXAMPLE XXIX

The process of Example XXVII is repeated in every essential respect with the exception that the catalyst $LiAlH_4$ is replaced by calcium hydride. The same product is recovered.

EXAMPLE XXX

The process of Example XXVII is repeated in every essential respect with the exception that potassium borohydride is used in lieu of lithium aluminum hydride.

Like reactions are achieved using these hydride catalysts and the corresponding arsine reactants.

As evidenced from the last four (4) examples, catalysts other than those given above are contemplated herein, such as simple alkali metal and alkaline earth metal hydrides and their complexes with group IIIA (periodic table) hydrides, such as sodium hydride, calcium hydride, lithium aluminum hydride, potassium borohydride, and the like.

The cyclic 1-substituted-4-phosphoridinones of the present invention have direct utility as gasoline additives. For example, up to about 10 milliliters of a mixture of any one of these phosphoridinones added to one gallon

*Table I*

| Example | Reactant | Catalyst | Mol Ratio, Reactant: Catalyst | Temperature, ° C. | Solvent | Product |
| --- | --- | --- | --- | --- | --- | --- |
| XV | bis(2-cyanoethyl)-methylarsine. | sodium tertiary-butoxide | 1:1 | reflux | toluene | 4-amino-1,2,5,6-tetrahydro-1-methylarsenin-3-carbonitrile. |
| XVI | bis(2-cyanoethyl)-amylarsine. | sodium isopropoxide | 1:1 | do | isopropyl alcohol | 4-amino-1,2,5,6-tetrahydro-1-amylarsenin-3-carbonitrile. |
| XVII | bis(2-cyanoethyl)-dodecylarsine. | sodium tertiary-butoxide | 1:1.5 | do | tertiary-butyl alcohol | 4-amino-1,2,5,6-tetrahydro-1-dodecylarsenin-3-carbonitrile. |
| XVIII | bis(2-cyanoethyl)-hexadecylarsine. | sodium ethoxide | 1.5:1 | do | ethyl alcohol | 4-amino-1,2,5,6-tetrahydro-1-hexadecylarsenin-3-carbonitrile. |
| XIX | bis(2-cyanoethyl)-2-methoxyethylarsine. | potassium tertiary butoxide. | 1:2 | do | benzene | 4-amino-1,2,5,6-tetrahydro-1-(2'-methoxyethyl)arsenin-3-carbonitrile. |
| XX | bis(2-cyanoethyl)-2-(2'-thienyl)ethylarsine. | sodium tertiary butoxide | 1:1 | do | tertiary butyl alcohol | 4-amino-1,2,5,6-tetrahydro-1-[2'-(2''-thienyl)ethyl]arsenin-3-carbonitrile. |
| XXI | bis(2-cyanoethyl)-benzylarsine. | potassium isopropoxide | 1:1 | do | isopropyl alcohol | 4-amino-1,2,5,6-tetrahydro-1-benzylarsenin-3-carbonitrile. |
| XXII | bis(2-cyanoethyl)-phenylarsine. | sodium tertiary-butoxide | 1:1 | do | dioxane | 4-amino-1,2,5,6-tetrahydro-1-phenylarsenin-3-carbonitrile |
| XXIII | bis(2-cyanoethyl)-2-methylphenylarsine. | do | 1:2 | do | toluene | 4-amino-1,2,5,6-tetrahydro-1-(2'-methylphenyl)arsenin carbonitrile. |
| XXIV | bis(2-cyanoethyl)-4-methylphenylarsine. | do | 1:2 | do | tertiary-butyl alcohol | 4-amino-1,2,5,6-tetrahydro-1-(4'-methylphenyl)arsenin-3 carbonitrile. |
| XXV | bis(2-cyanoethyl)-4-aminophenylarsine. | do | 1:1 | do | do | 4-amino-1,2,5,6-tetrahydro-1-(4'-aminophenyl)arsenin-3-carbonitrile. |
| XXVI | bis(2-cyanoethyl)-4-hydroxyphenylarsine. | do | 1:1 | do | xylene | 4-amino-1,2,5,6-tetrahydro-1-(4'-hydroxyphenyl)arsenin-3-carbonitrile. | of gasoline affords protection against misfiring, surface ignition, and the like.

The bis(2-cyanoethyl)alkyl- and bis(2-cyanoethyl)-aryl- arsine derivatives, i.e., the 4-amino-1-alkyl- and 4-amino-1-aryl-1,2,5,6-tetrahydroarsenin-3-carbonitriles, of the present invention inhibit the growth of typical fungi and bacteria as shown in the following table, the concentrations of the compounds contemplated herein being expressed as the minimal inhibitory concentrations (in micrograms) per milliliter of nutrient media:

Table II
ANTIFUNGAL ACTIVITY

| Organism | 4-amino-1,2,5,6-tetrahydro-1-phenylarsenin-3-carbonitrile (micrograms per milliliter) |
| --- | --- |
| Fusarium episphaeria | 1 or less.[1] |
| Hormodendrum cladosporoides | 1 or less. |
| Tricophyton mentagrophytes | 1 or less. |
| Myrethecium verrucaria | 1 or less. |
| Alternaria fasciculata | 1 or less. |
| Candida albicans | 15. |

ANTIBACTERIAL ACTIVITY

| Staphylococcus aureus | 8. |
| --- | --- |
| Bacillus subtilis | 4. |

[1] By "1 or less" is meant that 1 microgram per milliliter inhibits growth and that no minimal value below 1 is given.

The minimal inhibitory concentrations given in table II, above, are determined in a standard manner by the agar dilution streak technique which is well known and commonly used in testing new antibiotics.

While the results from but one typical compound are given in table II, it must be understood that the remainder of the "arsenin" product compounds contemplated herein give varying degrees of activity against the test organisms reported in the table and similar other such test organisms.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

The instant application is a continuation-in-part of U.S. Serial No. 20,257, filed April 6, 1960 and now abandoned.

We claim:
1. A cyclic phosphoridinone conforming to the formula

wherein R in the formula is a member selected from the group consisting of alkyl $C_1-C_{20}$, substituted and unsubstituted; phenyl, substituted and unsubstituted; said substituents on the alkyl moiety being selected from the group consisting of hydroxy, lower alkoxy, amino, pyridyl, furyl, thienyl and phenyl; and said substituents on the phenyl moiety being selected from the group consisting of lower alkyl and halogen.

2. 1-ethyl-4-phosphoridinone.
3. 1-(3'-hydroxypropyl)-4-phosphoridinone.
4. 1-(3'-aminopropyl)-4-phosphoridinone.
5. 1-[2'-(2"-pyridyl)ether]-4-phosphoridinone.
6. 1-phenyl-4-phosphoridinone.

7. A 4-amino-1,2,5,6-tetrahydro-1-substituted phosphorin-3-carbonitrile corresponding to the formula

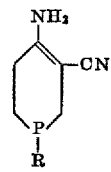

wherein R in the formula is a member selected from the group consisting of alkyl $C_1-C_{20}$, substituted and unsubstituted; phenyl, substituted and unsubstituted; said substituents on the alkyl moiety being selected from the group consisting of hydroxy, lower alkoxy, amino, pyridyl, furyl, thienyl and phenyl; and said substituents on the phenyl moiety being selected from the group consisting of lower alkyl and halogen.

8. 4-amino-1,2,5,6-tetrahydro-1-ethylphosphorin-3-carbonitrile.
9. 4-amino-1,2,5,6-tetrahydro-1-(3'-hydroxypropyl)phosphorin-3-carbonitrile.
10. 4-amino-1,2,5,6-tetrahydro-1-(3'-aminopropyl)phosphorin-3-carbonitrile.
11. 4-amino-1,2,5,6-tetrahydro-1-[2'-(2"-pyridyl)ethyl]phosphorin-3-carbonitrile.
12. 4-amino-1,2,5,6-tetrahydro-1-phenylphosphorin-3-carbonitrile.
13. A method of cyclizing a bis(2-cyanoethyl) substituted phosphine corresponding to the formula

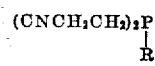

wherein R in the formula is a member selected from the group consisting of alkyl $C_1-C_{20}$, substituted and unsubstituted; phenyl, substituted and unsubstituted; said substituents on the alkyl moiety being selected from the group consisting of hydroxy, lower alkoxy, amino, pyridyl, furyl, thienyl and phenyl; and said substituents on the phenyl moiety being selected from the group consisting of lower alkyl and halogen; which comprises subjecting said phosphine in the presence of an alkali metal alkoxide and an inert organic solvent to a temperature in the range of 15° C. to 140° C., said phosphine reactant being added to the base catalyst.

14. The process of claim 13 in which the temperature is in the range of 80° C. to 120° C.

15. The process of claim 13 in which the phosphine reactant is added to the base catalyst at a rate sufficient to provide but a relatively small concentration of uncyclized dinitrile reactant throughout substantially all of the reaction.

16. A method which comprises reacting with water in the presence of a mineral acid a 4-amino-1,2,5,6-tetrahydro-1-substituted phosphorin-3-carbonitrile of the formula

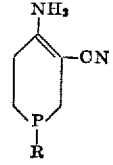

to produce the corresponding cyclic 1-substituted phosphoridinone corresponding to the formula

wherein in the formulae is a member selected from the group consisting of alkyl $C_1$–$C_{20}$, substituted and unsubstituted; phenyl, substituted and unsubstituted; said substituents on the alkyl moiety being selected from the group consisting of hydroxy, lower alkoxy, amino, pyridyl, furyl, thienyl and phenyl; and said substituents on the phenyl moiety being selected from the group consisting of lower alkyl and halogen.

17. The process of claim 16 wherein the carbonitrile-water reactants are heated to a temperature in the range of 25° C. to 110° C.

18. The process of claim 16 wherein the carbonitrile-water reactants are heated to a temperature of about 110° C.

19. The process of claim 16 wherein the mineral acid is a non-oxidizing strong acid which under the conditions of the reaction does not oxidize the carbonitrile reactant and the phosphoridinone product.

20. The process of claim 16 wherein the reactant is 4-amino-1,2,5,6-tetrahydro-1-ethylphosphorin-3-carbonitrile and the product is 1-ethyl-4-phosphoridinone.

21. The process of claim 16 wherein the reactant is 4-amino - 1,2,5,6 - tetrahydro-1-(3'-hydroxypropyl)phosphorin-3-carbonitrile and the product is 1-(3'-hydroxypropyl)-4-phosphoridinone.

22. The process of claim 16 wherein the reactant is 4-amino - 1,2,5,6 - tetrahydro -1- (3'-aminopropyl)phosphorin-3-carbonitrile and the product is 1-(3'-aminopropyl)-4-phosphoridinone.

23. The process of claim 16 wherein the reactant is 4-amino - 1,2,5,6 - tetrahydro - 1 - [2'-(2''-pyridyl)ethyl]-phosphorin-3-carbonitrile and the product is 1-[2'-(2''-pyridyl)ethyl]-4-phosphoridinone.

24. The process of claim 16 wherein the reactant is 4-amino - 1,2,5,6 - tetrahydro-1-phenylphosphorin-3-carbonitrile and the product is 1-phenyl-4-phosphoridinone.

25. A method of preparing a cyclic 1-substituted phosphoridinone which comprises a cyclizing a bis(2-cyanoethyl) substituted phosphine of the formula

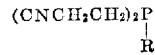

in the presence of an alkali metal alkoxide catalyst, at a temperature in the range of 15° C. to 140° C. and in the presence of an inert organic solvent, to produce the corresponding 4 - amino - 1,2,5,6 - tetrahydro - substituted phosphorin-3-carbonitrile of the formula

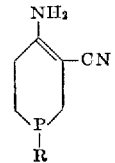

and, without recovering said carbonitrile, reacting same with water in the presence of a mineral acid and at a temperature in the range of 25° C. to 110° C. to produce the corresponding cyclic phosphoridinone of the formula

R in each of the above formulae being a member selected from the group consisting of alkyl $C_1$–$C_{20}$, substituted and unsubstituted; phenyl, substituted and unsubstituted; said substituents on the alkyl moiety being selected from the group consisting of hydroxy, lower alkoxy, amino, pyridyl, furyl, thienyl and phenyl; and said substituents on the phenyl moiety being selected from the group consisting of lower alkyl and halogen.

26. A novel cyclic compound selected from the group consisting of 4 - amino - 1,2,5,6-tetrahydro-1-substituted phosphorin-3-carbonitrile and 4-amino-1,2,5,6-tetrahydro-1-substituted arsenin-3-carbonitrile corresponding to the formula

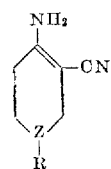

wherein Z is a member selected from the group consisting of phosphorus and arsenic and R is a member selected from the group consisting of alkyl $C_1$–$C_{20}$, substituted and unsubstituted; phenyl, substituted and unsubstituted; said substituents on the alkyl moiety being selected from the group consisting of hydroxy, lower alkoxy, amino, phenyl, pyridyl, furyl and thienyl; and said substituents on the phenyl moiety being selected from the group consisting of lower alkyl and halogen.

27. A 4-amino-1,2,5,6-tetrahydro-1-substituted arsenin-3-carbonitrile corresponding to the formula

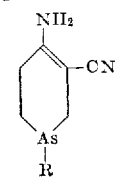

wherein R in the formula is a member selected from the group consisting of alkyl $C_1$–$C_{20}$, substituted and unsubstituted; phenyl, substituted and unsubstituted; said substituents on the alkyl moiety being selected from the group consisting of hydroxy, lower alkoxy, amino, pyridyl, furyl, thienyl and phenyl; and said substituents on the phenyl moiety being selected from the group consisting of lower alkyl and halogen.

28. 4 - amino - 1,2,5,6 - tetrahydro - 1 - methylarsenin-3-carbonitrile.

29. 4 - amino - 1,2,5,6 - tetrahydro - 1 - amylarsenin-3-carbonitrile.

30. 4 - amino - 1,2,5,6 - tetrahydro - 1 - (2' - methoxyethyl)arsenin-3-carbonitrile.

31. 4 - amino - 1,2,5,6 - tetrahydro - 1 - phenylarsenin-3-carbonitrile.

32. 4 - amino - 1,2,5,6 - tetrahydro - 1 - (4' - aminophenyl)arsenin-3-carbonitrile.

33. A method of preparing a cyclic 1-substituted phosphoridinone which comprises cyclizing a bis(2-cyanoethyl) substituted phosphine of the formula

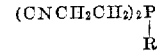

in the presence of a catalyst selected from the group consisting of an alkali metal alkoxide, and an alkali metal hydride, at a temperature in the range of 15° C. to 140° C. and in the presence of an inert organic solvent, to produce the corresponding 4-amino-1,2,5,6-tetrahydro-substituted phosphorin-3-carbonitrile of the formula

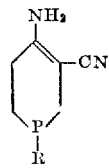

and, without recovering said carbonitrile, reacting same with water in the presence of a mineral acid and at a temperature in the range of 25° C. to 110° C. to produce the corresponding cyclic phosphoridinone of the formula

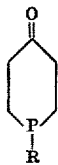

R in each of the above formulae being a member selected from the group consisting of alkyl $C_1$–$C_{20}$, substituted and unsubstituted; phenyl, substituted and unsubstituted; said substituents on the alkyl moiety being selected from the group consisting of hydroxy, lower alkoxy, amino, pyridyl, furyl, thienyl and phenyl; and said substituents on the phenyl moiety being selected from the group consisting of lower alkyl and halogen.

References Cited in the file of this patent
UNITED STATES PATENTS

| | | |
|---|---|---|
| 2,790,806 | Middleton | Apr. 30, 1957 |
| 2,909,529 | Thesing | Oct. 20, 1959 |

UNITED STATES PATENT OFFICE
CERTIFICATE OF CORRECTION

Patent No. 3,094,545                        June 18, 1963

Richard P. Welcher et al.

It is hereby certified that error appears in the above numbered patent requiring correction and that the said Letters Patent should read as corrected below.

Column 2, line 57, for "eicosplphosphorin-" read -- eicosylphosphorin --; line 63, for "tetrahydrol-" read -- tetrahydro --; column 7, line 6, after "with" insert -- refluxing --; column 11, line 1, after "wherein" insert -- R --; line 38, strike out "a", first occurrence.

Signed and sealed this 31st day of March 1964.

(SEAL)
Attest:
ERNEST W. SWIDER

Attesting Officer

EDWARD J. BRENNER

Commissioner of Patents